Figure 1:
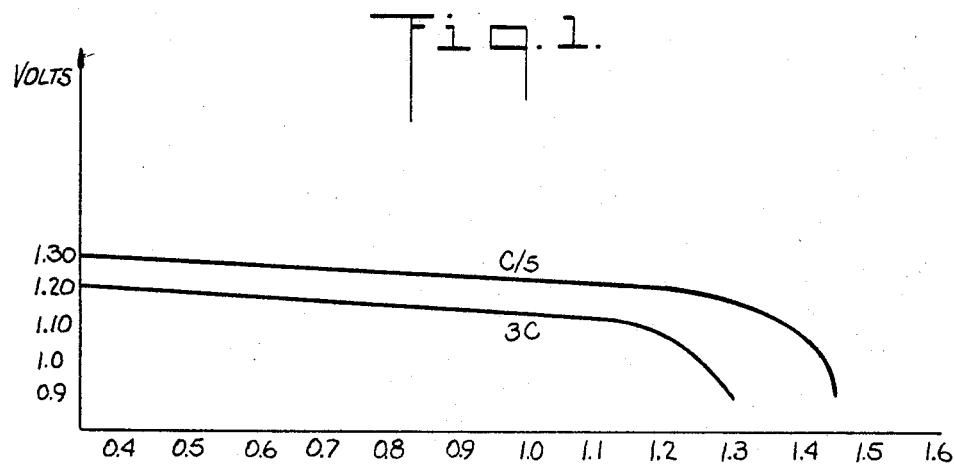

United States Patent Office 3,281,272
Patented Oct. 25, 1966

3,281,272
METHOD FOR MAKING NICKEL ELECTRODES FOR ELECTROLYTIC CELLS
Karl Ackermann, Mannheim, Germany, and Charles V. Herold, Paris, France; Karl Siebert, legal representative of said Karl Ackermann, deceased, assignors to Société des Accumulateurs Fixes et de Traction (Société Anonyme), Romainville, Seine, France, a French company
Filed July 30, 1963, Ser. No. 298,664
Claims priority, application France Aug. 3, 1962, 906,038; July 3, 1963, 940,270; July 4, 1963, 940,434
18 Claims. (Cl. 136—29)

The present invention relates essentially to a method of manufacturing electrodes for electrolytic cells, electric storage batteries and similar applications, of the type wherein the electrode forming plate comprises a porous metallic support in the pores of which active materials are introduced which consist wholly or partially of oxides or hydroxides of the metal constituting said support.

Porous plates of this character are already known in the electrical field. Thus, typical examples of such plates are those obtained by sintering a metal powder such as nickel powder in order to provide a porous support. The aforesaid active materials are introduced into the pores of this support. In the case of plates to be used as positive electrodes these active materials consist as a rule wholly or partly of oxides or hydroxides of the metal constituting said support. In the case of a plate wherein the support is made of sintered nickel the active material will consist of nickel hydroxide.

Although the principle of this manufacture is theoretically simple its practical actuation is attended by very serious difficulties. In fact, the electrical capacity of a plate depends of course chiefly on the quantity of active material absorbed thereby and also on its distribution in the support. Therefore care must be taken that the pores are filled to a maximum degree as consistent with the porosity necessary for the electrochemical exchanges.

Various methods are used to this end. Firstly, impregnation is used. In this method, a solution of a salt the metal of which is to constitute the active mass is prepared, and the plate is immersed in this solution, whereafter the oxide or hydroxide is precipitated by means of a more or less concentrated alkali solution. Practice proved that only repeated impregnations of this kind could yield practical results. Therefore, the present practice consists in carrying out six or seven consecutive impregnations, each comprising a precipitation step, a washing step and a drying step. It is clear that although this process is advantageous from the point of view of the end result, it is quite costly.

On the other hand, it has also been proposed to deposit the active material by means of an electrochemical process. In this case the support is immersed into an electrolyte containing a salt of the metal to be used as the active mass, and the plate is subsequently subjected to a cathodic polarization. As the operation is carried out in an aqueous solution, a deposit of the desired metal oxide or hydroxide is formed inside the pores. This method, which dates from 1936, was not satisfactory because the pore filling was far from perfect.

Quite recently a third method has been proposed, in which metal in the support itself is transformed into oxides or hydroxides which are to constitute the active mass. In other words, the idea consists in "activating" the support proper. This method is carried out by using a solution of a salt of a weakly basic metal such as aluminum, the plate being immersed in this solution. When the pore filling is completed and the plate is subsequently exposed to the atmospheric air an exothermic reaction takes place which is attended by the release of gas. To carry out the reaction as far as possible the plate should be exposed to a warm and moist atmosphere throughout the reaction which may last several hours.

The walls of the pores are attacked by the basic salt, and when the reaction is completed they are lined with nickel hydrate. Then the plate is simply dipped into an alkali solution to eliminate the salts which have built up during the reaction. A simple washing step with water and a drying step are sufficient to complete the operation.

This method was used to advantage with nickel plates, notably when making positive plates. However, it was observed that the efficiency of this method could be improved considerably. In fact, the attack of the support by the basic salt solution must be limited, otherwise the mechanical strength of the support would be impaired. Therefore, upon completion of the activation step the weight of the sintered nickel in the support should not have dropped by more than 40% of its initial value. Then the pores are properly lined with nickel hydrate, but the desired electrical capacity is not obtained. The plate porosity decreases by only about 30 to 40%, so that some kind of addition can be resorted to for increasing the amount of hydrate.

The method according to this invention avoids all the drawbacks set forth hereinabove which characterized known processes and permits of producing plates of the type specified under the most economical and advantageous conditions, the resulting plates having at the same time a considerably greater capacity.

The method of this invention is remarkable notably in that it comprises the combination of two operating steps used in succession and in a predetermined order, the first step consisting in forming the hydrates or oxides by attacking the support directly by means of a salt of a weak base in an aqueous solution and subsequently immersing said support in an alkaline hydrate solution, after which the plate is washed and dried, the second step consisting in treating the plate issuing from the first operating step by means of a single polarization or impregnation in order to fill in the pores of the metal support with hydroxides or oxides resulting from a decomposition of an additional metallic salt.

The activating salt solution used in the first step is a solution of a salt of a weak base and a strong oxidizing acid. Aluminum nitrate, aluminum chlorate, and ammonium nitrate, are suitable as activating salts. The solution may contain a single activating salt or a mixture of activating salts such as a mixture of aluminum nitrate and ammonium nitrate. The activating salt solution may contain acetic acid in addition to the aluminum or ammonium salt, if desired. Nickel nitrate may also be included in the activating solution if desired.

In one embodiment of the invention, the salt suitable for carrying out the first step set forth hereinabove consists of an aluminum salt, i.e., aluminum nitrate, $Al(NO_3)_3$, aluminum chlorate $Al(ClO_3)_3$ or the like, either alone or in admixture with nickel nitrate.

According to a modified embodiment the metal support of the electrode is attacked directly by an aqueous solution containing acetic acid and at least one oxygenated aluminum salt such as nitrate.

According to another modified embodiment the aforesaid support is attacked by a mixture of ammonium nitrate with at least one oxygenated aluminum salt such as nitrate.

If desired and without departing from the scope of the invention, nickel nitrate may be added to one of the aforesaid mixtures.

It is also within the purpose of this invention to use to this end a mixture of an oxygenated aluminum salt, such as nitrate, with nitrates of nickel and ammonium, and acetic acid.

It is recommended, according to this invention, to use both the nickel nitrate and the acetic acid in a crystallizable form.

According to a further modified embodiment of this invention the metallic support of the electrode is attacked during the first operating step by an aqueous solution of ammonium nitrate, nickel nitrate, or a mixture of both, plus acetic acid.

According to an alternate embodiment, the aforesaid metallic support is attacked by an aqueous solution of ammonium nitrate.

If desired, nickel nitrate may be added to the aqueous solution of said ammonium nitrate.

The proportions of ingredients in the activating solution are not critical. The proportion of ammonium nitrate when used may be varied in relation to the proportion of aluminum nitrate and other ingredients. Preferably it is a multiple of this last-named proportion.

The amount of acetic acid when used can be varied and generally represents only a fraction of the amount of aluminum nitrate, ammonium nitrate, or the combined amounts of these two, as the case may be. For example, in one embodiment of the invention, the proportion of acetic acid could be for example about one-third of that of each one of the other component elements of the solution. Thus, for instance, if one part of crystallizable acetic acid is used three parts of nickel nitrate or ammonium nitrate can be used.

It was also observed that the operation could be further accelerated by using, according to a further feature of this invention, a so-called accelerating substance during the first operating step set forth hereinabove, with a view to increase the conductivity of the solution. An alkaline salt, such as sodium sulfate or the like, is suitable for this purpose. Preferably, the accelerator salt may constitute from 5 to 12% of the main treatment salt, but this range should not be construed as limiting the present invention.

The second step of this invention consists in contacting the plate with a suitable nickel salt, e.g. nickel nitrate, and either impregnating said plate with said nickel salt or cathodically polarizing said plate while immersed in said nickel salt. In the case of impregnation, this salt is then decomposed by using an alkali solution, and the plate is washed and dried as conventional in any known impregnation processes.

When cathodic polarization is used in the second operating step set forth hereinabove, the plate issuing from the first step (which is therefore washed and dried) is immersed in a solution of a metallic salt, for example nickel nitrate, in the case of a sintered nickel plate, and subsequently subjected to a cathodic polarization during several hours with a low-density current.

Still according to this invention, in the case of the manufacture of a positive plate with a sintered metal support the following procedure may be adhered to for instance:

The plate is immersed during a very short time (for instance from 15 seconds to 1 minute) in an aluminum nitrate solution kept at a temperature ranging from 50° to 80° C. to fill in the pores; the reaction is allowed to proceed in atmospheric air during at least half an hour and preferably during several hours, in a warm and moist atmosphere; the plate is immersed in a potash solution, washed and dried; the plate is immersed in a nickel nitrate solution, after which the plate is subjected to a cathodic polarization during several hours with a low-density current, or with a stronger current during a shorter time period, the final amount of ampere hours utilized in either case being substantially the same, or alternatively the plate is immersed in a soda solution.

The results obtained by carrying out the method of of this invention are quite remarkable. In fact, plates are obtained under very economical conditions and have capacity values at least equal to those of the plates obtained according to the conventional methods after six or seven successive impregnations, the capacity of these plates remaining constant even after several hundred charges and discharges, while at the same time avoiding the disadvantages of prior methods which, although perhaps easier to carry out, are less satisfactory from the point of view of the final result.

Of course, this invention is also concerned, by way of novel industrial products, with the plates and electrodes of all types obtained with the method set forth hereinabove.

A few typical examples illustrating the manner in which the method of this invention may be carried out in practice will now be described:

*Example I*

A sintered nickel plate, the nickel of which is obtained by thermal decomposition of carbonyl nickel is used; the active surface area of the plate is 6.2 square inches and its thickness is 0.035 inch.

This plate is firstly treated by immersion in a concentrated solution of aluminum nitrate $Al(NO_3)_3$ kept at a temperature of 50° to 80° C., during about 10 seconds. Then the plate is exposed during at least 30 minutes, preferably during several hours to saturated steam, whereafter it is immersed during a time period of thirty to sixty minutes in a 20% caustic soda solution kept at a temperature of 60° to 80° C. After the washing and drying steps this plate is immersed in a concentrated solution of a nickel nitrate and then subjected to the action of a 20% caustic potash solution, as conventional in hitherto known impregnation methods. After a single impregnation the plate is washed and dried. After having thus been formed the plate has a capacity of about 0.2 amp.-hr. per square inch, that is, a 17% increase in relation to the capacity obtained with a plate which has been activated with aluminum nitrate only. FIGURE 1 shows the trend of the discharge curve at current densities corresponding to $c/5$ and to $3c$, where $c$ is the capacity of the plate.

*Example II*

Figure 2:
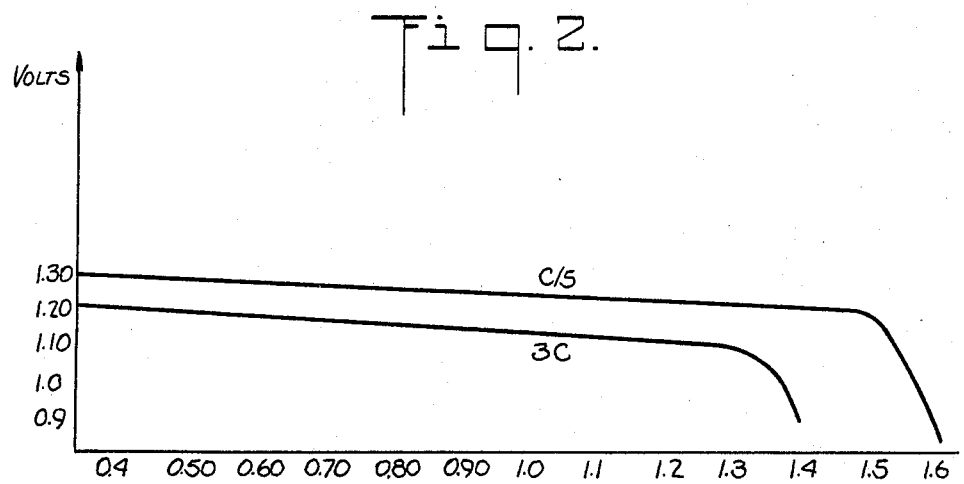

A plate of the same dimensions and same thickness as that used in Example I is subjected to the same activating operation. After washing and drying it is polarized cathodically in a concentrated solution of nickel nitrate $Ni(NO_3)_2$, for instance with a 0.2 amp. current density during six hours or with a stronger current during a shorter time period, the amount of ampere-hours being the same in either case. The plate is then washed and dried. After its formation the plate capacity is 0.26 amp.-hr. per square inch, a 33% increase in relation to the capacity of a plate subjected to an activation with aluminum nitrate only. FIGURE 2 shows the trend of the discharge curves at current densities corresponding to $c/5$ and $3c$.

*Example III*

A porous plate similar to that of Example I is used. This plate is immersed during 10 seconds in a solution of which the temperature is kept at 70° C., this solution having the following composition:

| | Parts |
|---|---|
| Aluminum nitrate | 5 |
| Crystallizable acetic acid | 1 |
| Water | 2 |

After this immersion, the plate is exposed to atmospheric air during about 30 minutes and subsequently subjected during a time period of 30 to 90 minutes to the action of saturating water steam. After this last treatment, the plate is immersed during 30 minutes in a caustic soda solution kept at 80° C.

After the washing and drying steps, this plate is polarized cathodically in a nickel nitrate solution during 6 hours, at 0.2 amp. or during 3 hours at 0.4 amp., for example. The plate capacity, after its formation, is 1.45 amp.-hr.

*Example IV*

A plate similar to the one used in Example I hereinabove is immersed during 10 seconds in a solution containing:

| | Parts |
|---|---|
| Aluminum nitrate | 1 |
| Ammonium nitrate | 3 |
| Nickel nitrate | 1 |
| Water | 3 |

After a treatment similar to that described in Example I hereinabove, and after its formation, the plate showed a capacity of 1.60 amp.-hr.

*Example V*

A sintered nickel plate similar to that of Example I is used.

This plate is immersed for about 10 seconds in a solution kept at 70° C. and containing the following constituents:

| | Parts |
|---|---|
| Ammonium nitrate | 3 |
| Crystallized nickel nitrate | 3 |
| Crystallizable acetic acid | 1 |
| Water | 3 |

The plate is exposed to air for about 30 minutes, and whereafter it is subjected for about 30 to 90 minutes to the action of saturated steam.

Then the plate is treated for 30 minutes with a caustic soda solution kept at 80° C. After washing and drying, the plate is polarized cathodically in a concentrated solution of nickel nitrate for 6 hours, at 0.2 amp., or for 3 hours at 0.4 amp. for example. After its formation the plate had a capacity of 1.4 amp.-hr.

*Example VI*

A sintered nickel plate similar to that described in Example I is activated by immersion for about 10 seconds in a solution at 70° C. having the following composition:

| | Parts |
|---|---|
| Ammonium nitrate | 3 |
| Crystallizable acetic acid | 1 |
| Water | 3 |

The plate is exposed to air for 30 minutes and thereafter is subjected for about 30 to 90 minutes to the action of saturated steam. The plate is then treated for 30 minutes with a caustic soda solution at 80° C. After washing and drying, the plate is cathodically polarized in a concentrated solution of nickel nitrate as described in Example V. The capacity of the plate thus formed is 1.5 ampere hours.

Of course, the invention should not be construed as being limited by the specific examples described and the proportions given herein which are cited by way of example only.

We claim:

1. A process for making porous sintered nickel electrodes which comprises immersing a porous sintered nickel plate in an aqueous solution consisting of at least one activating compound selected from the group consisting of aluminum nitrate, aluminum chlorate, and ammonium nitrate, contacting said plate with an aqueous caustic alkali solution, washing and drying said plates, contacting said plate with an aqueous solution of a nickel salt, and decomposing said nickel salt to form a compound selected from the group consisting of nickel oxide and nickel hydroxide in the pores of said plate.

2. A process according to claim 1 wherein said activating compound is aluminum nitrate.

3. A process according to claim 1 wherein said activating compound is ammonium nitrate.

4. A process for making porous sintered nickel electrodes which comprises immersing a porous sintered nickel plate in an aqueous solution consisting of (a) at least one activating compound selected from the group consisting of aluminum nitrate, aluminum chlorate, and ammonium nitrate and (b) acetic acid, contacting said plate with an aqueous caustic alkali solution, washing and drying said plate, contacting said plate with an aqueous solution of a nickel salt, and decomposing said nickel salt to form a compound selected from the group consisting of nickel oxide and nickel hydroxide.

5. A process for making porous sintered nickel electrodes which comprises immersing a porous sintered nickel plate in an aqueous solution consisting of (a) at least one activating compound selected from the group consisting of aluminum nitrate, aluminum chlorate, and ammonium nitrate and (b) nickel nitrate, contacting said plate with an aqueous caustic alkali solution, washing and drying said plate, contacting said plate with an aqueous solution of a nickel salt, and decomposing said nickel salt to form a compound selected from the group consisting of nickel oxide and nickel hydroxide.

6. A process for making porous sintered nickel electrodes which comprises immersing a porous sintered nickel plate in an aqueous solution which consists of (a) at least one activating compound selected from the group consisting of aluminum nitrate, aluminum chlorate, and ammonium nitrate, and (b) from 5 to 12 percent by weight of sodium sulfate, based on the amount of said salt selected from the group consisting of aluminum nitrate, aluminum chlorate and ammonium nitrate, contacting said plate with an aqueous caustic alkali solution, washing and drying said plate, contacting said plate with an aqueous solution of a nickel salt, and decomposing said nickel salt to form a compound selected from the group consisting of nickel oxide and nickel hydroxide in the pores of said plate.

7. A process for making porous sintered nickel electrodes which comprises immersing a porous sintered nickel plate in an aqueous solution consisting of at least one activating compound selected from the group consisting of aluminum nitrate, aluminum chlorate, and ammonium nitrate, contacting said plate with an aqueous caustic alkali solution, washing and drying said plate, contacting said plate with an aqueous solution of a nickel salt, then contacting said plate with an aqueous caustic alkali solution, thereby forming a compound selected from the group consisting of nickel oxides and hydroxides in the pores of said plate.

8. A process for making porous sintered nickel electrodes which comprises immersing a porous sintered nickel plate in an aqueous solution consisting of aluminum nitrate, contacting said plate with an aqueous caustic alkali solution, washing and drying said plate, contacting said plate with an aqueous solution of a nickel salt, then contacting said plate with an aqueous caustic alkali solution, thereby forming a compound selected from the group consisting of nickel oxides and hydroxides in the pores of said plate.

9. A process for making porous sintered nickel electrodes which comprises immersing a porous sintered nickel plate in an aqueous solution consisting of at least one activating compound selected from the group consisting of aluminum nitrate, aluminum chlorate, and ammonium nitrate, contacting said plate with an aqueous caustic alkali solution, washing and drying said plate, and cathodically polarizing said plate in the presence of an aqueous solution of a nickel oxygenated salt to form a compound selected from the group consisting of nickel oxide and nickel hydroxide in the pores of said plate.

10. A process for making porous sintered nickel electrodes which comprises immersing a porous sintered nickel plate in an aqueous solution consisting of aluminum nitrate, contacting said plate with an aqueous caustic alkali solution, washing and drying said plate, and cathodically polarizing said plate in the presence of an aqueous solution of a nickel oxygenated salt to form a compound selected from the group consisting of nickel oxide and nickel hydroxide in the pores of said plate.

11. A process according to claim 10 wherein said nickel oxygenated salt is nickel nitrate.

12. A process according to claim 10 wherein said aluminum nitrate solution also contains acetic acid.

13. A process for making porous sintered electrodes which comprises immersing a porous sintered nickel plate in an aqueous solution consisting of ammonium nitrate, contacting said plate with an aqueous caustic alkali solution, washing and drying said plate, and cathodically polarizing said plate in the presence of an aqueous solution of a nickel oxygenated salt to form a compound selected from the group consisting of nickel oxide and nickel hydroxide in the pores of said plate.

14. A process according to claim 13 wherein said nickel oxygenated salt is nickel nitrate.

15. A process according to claim 13 wherein said solution of ammonium nitrate also contains acetic acid.

16. A process according to claim 13 wherein said solution of ammonium nitrate also contains nickel nitrate.

17. A process for making porous sintered nickel electrodes which comprises immersing a porous sintered nickel plate in an aqueous solution consisting of aluminum nitrate, the temperature of said solution being in the range of 50° to 80° C., contacting said plate with an aqueous caustic alkali solution, washing and drying said plate, contacting said plate with an aqueous solution of a nickel salt, then contacting said plate with an aqueous caustic alkali solution, thereby forming a compound selected from the group consisting of nickel oxides and hydroxides in the pores of said plate.

18. A process for making porous sintered nickel electrodes which comprises immersing a porous sintered nickel plate in an aqueous solution consisting of aluminum nitrate, the temperature of said solution being in the range of 50° to 80° C., contacting said plate with an aqueous caustic alkali solution, washing and drying said plate, and cathodically polarizing said plate in the presence of an aqueous solution of a nickel salt to form a compound selected from the group consisting of nickel oxide and nickel hydroxide in the pores of said plate.

References Cited by the Examiner

UNITED STATES PATENTS

| | | | |
|---|---|---|---|
| 2,880,257 | 3/1959 | Murphy et al. | 136—122 |
| 2,969,414 | 1/1961 | Fleischer | 136—29 |
| 3,041,388 | 6/1962 | Fukuda et al. | 136—24 |
| 3,228,795 | 1/1966 | Ackermann | 136—29 |

FOREIGN PATENTS

| | | |
|---|---|---|
| 581,849 | 8/1959 | Canada. |

WINSTON A. DOUGLAS, *Primary Examiner.*

A. SKAPARS, *Assistant Examiner.*